United States Patent [19]

Koschnitzke et al.

[11] 4,400,097
[45] Aug. 23, 1983

[54] SYSTEM FOR MEASURING TEMPERATURES IN PRESSURIZED REACTORS

[75] Inventors: Walter Koschnitzke; Paul Beuth, both of Oberhausen, Fed. Rep. of Germany

[73] Assignee: Ruhrchemie Aktiengesellschaft, Oberhausen, Fed. Rep. of Germany

[21] Appl. No.: 265,711

[22] Filed: May 20, 1981

[30] Foreign Application Priority Data

Feb. 7, 1981 [DE] Fed. Rep. of Germany ....... 3104258

[51] Int. Cl.$^3$ ............................ G01J 5/08; G01J 5/48
[52] U.S. Cl. ..................................... 374/121; 356/43; 374/135; 374/123; 376/247
[58] Field of Search ............... 73/355 R; 356/43, 438; 376/258; 374/121, 135, 139

[56] References Cited

U.S. PATENT DOCUMENTS

| | | | |
|---|---|---|---|
| 2,562,864 | 7/1951 | Jury et al. | 73/355 R X |
| 2,811,856 | 11/1957 | Harrison | 73/355 R |
| 2,963,353 | 12/1960 | Eastman | 356/43 X |
| 3,436,965 | 4/1969 | Land | 73/355 R |
| 4,290,182 | 9/1981 | Lawrence | 356/43 X |
| 4,297,891 | 11/1981 | Falcon | 73/756 |

*Primary Examiner*—Daniel M. Yasich
*Attorney, Agent, or Firm*—Sprung, Horn, Kramer & Woods

[57] ABSTRACT

A system for the measurement of temperatures in a reactor such as those operated under high pressure and/or temperature is disclosed. The temperature is measured by the use of a pyrometer which is in optical communication with a measuring duct which can be disposed in the wall of the reactor and is in optical communication with the reactor interior. The measuring duct comprises two concentric tubes the outer one of which extends beyond the inner tube in the direction of the reactor interior and has a conical construction immediately following the termination of the inner tube. The concentric tubes are provided with a common end section such as in the form of a cone in the direction of the reactor exterior. A hermetic housing defining a safety chamber is disposed exterior thereof, the hermetic housing having two opposed pressure type and heat resistant windows in alignment with the inner tube and the pyrometer. The hermetic housing is not normally permanently attached to the measuring duct. Means are provided to mount the measuring duct against an exterior wall of a reactor. Means are also disclosed to maintain the windows free of condensation, carbon deposits, etc. and to insure the continuous measurement of the temperature within such reactor.

12 Claims, 2 Drawing Figures

SYSTEM FOR MEASURING TEMPERATURES IN PRESSURIZED REACTORS

BACKGROUND OF THE INVENTION

1. Field of the Invention

The present invention relates to a system for measuring temperatures in reactors operated at high temperatures and under pressure, such as reactors burning coal dust in power plants or pressurized coal-gasification plants, by the use of a pyrometer.

2. Discussion of Prior Art

The gasification of bituminous coal or lignite involves its partial combustion with oxygen or oxygen-containing gases in the presence of water to give mixtures of carbon monoxide and hydrogen. In the process, powdered coal or coal dust is reacted at temperatures ranging from about 900° to 1600° C., and preferably from 1100° to 1500° C., and elevated pressures of up to 200 bars, and preferably between 5 and 100 bars. This operation is advantageous mainly because modern mechanized coal-mining methods result in an increasing volume of coal dust. An added factor is that powdered coal of practically any grade can be converted to synthesis gas regardless of its tendency to cake, ash content, etc.

A typical example of a coal-gasification process using powdered coal is the Texaco process. In this process, comminuted coal is ground in a mill and then fed to a suspension tank. There a stable, pumpable suspension is prepared by the addition of fresh and recycled water. The coal suspension is pressurized by means of a pump and continuously fed to the burner at the top of the gasification reactor. Such a process is described in German Pat. No. 20 44 310, for example.

The measurement of temperatures in such reactors poses considerable difficulties. One difficulty is due to the extremely aggressive atmosphere, which militates against the use of thermocouples since these are rapidly embrittled by the action of high-temperature hydrogen. Other problems arise from the slag contained in the coal, which in the molten form destroys the protective tubes of thermometers or, when pyrometers are used, can result in deposits in the mesuring duct. Such deposits will produce distortion in the temperature measurements obtained from a pyrometer. The accuracy of measurement is adversely affected also by the fact that in the cooler zones of the reactor the carbon monoxide decomposes into carbon dioxide and carbon in accordance with the Boudouard equilibrium. The particulate carbon can result in the formation of a film which absorbs the radiation to be measured and thus results in false measurements.

SUMMARY OF THE INVENTION

Broadly, this invention contemplates an apparatus for the measurement of temperatures in a reactor such as a reactor operated at high pressure and/or high temperature, which apparatus comprises a pyrometer, an optical communication with a measuring duct disposable through a wall of the reactor and in optical communication with the reactor interior, said measuring duct comprising two concentric tubes, the other tube extending beyond the inner tube in the direction of the reactor interior and having a conical constriction immediately following the end of said inner tube, said concentric tubes being provided with a common end section in the direction of the reactor exterior; said apparatus comprising a hermetic housing defining a safety chamber with two opposed pressure tight and heat resistant windows disposed directly adjacent to said common end section without being permanently affixed thereto, the common end section comprising means to join the same to a reactor wall.

The apparatus is preferably constructed such that the common end section to which the concentric tubes are attached is in the form of a cone.

The hermetic housing is disposed in alignment such that the pressure tight and heat resistant windows are in optical alignment with the pyrometer and the measurement tube. The hermetic housing can be temporarily secured to said common end section but is normally not permanently affixed thereto. The common end section can be attached to a reactor wall by the use of a flange mechanism which can include a shut-off device as seen in the drawings discussed below.

The apparatus of this invention comprises means to ensure that the various optical components do not become covered, coated, or obscured by the deposit of condensation, carbonaceous components, slag, ash, etc. which may be present in the environment in which the device is employed. To that end, for instance, the safety chamber can be in fluid communication with a source of gas via a pressure monitor and flow monitor whereby gas can be fed into the safety chamber at a pressure higher than the pressure imposed against the safety chamber by virtue of the environment within the reactor. Such insures that the safety chamber is not destroyed by the excess pressures and that the temperatures within the reactor can be continuously monitored. To insure that the windows of the hermetic housing do not reach temperatures which are unduly high, the apparatus can be further provided with channels within the body of the hermetic housing to which coolants can pass. The channels are disposed proximate the heat resistant windows.

The apparatus further comprises means for insuring that components are disposed on or coat the exterior surface of the window of the hermetic housing closer to the reactor. To that end through the body of the apparatus there is disposed a pipe in fluid communication with a source of inert gas such as nitrogen which can continuously or intermittently sweep the exterior surface of such window. The apparatus is further provided with means whereby such inert gas is caused to pass through the interior surface of said inner tube to further insure that condensate does not form in any windows provided at the internal end of the inner tube.

BRIEF DESCRIPTION OF THE DRAWINGS

The invention can be more readily understood and appreciated when reference is made to the accompanying drawings in which.

DESCRIPTION OF SPECIFIC EMBODIMENTS

Figure 2:
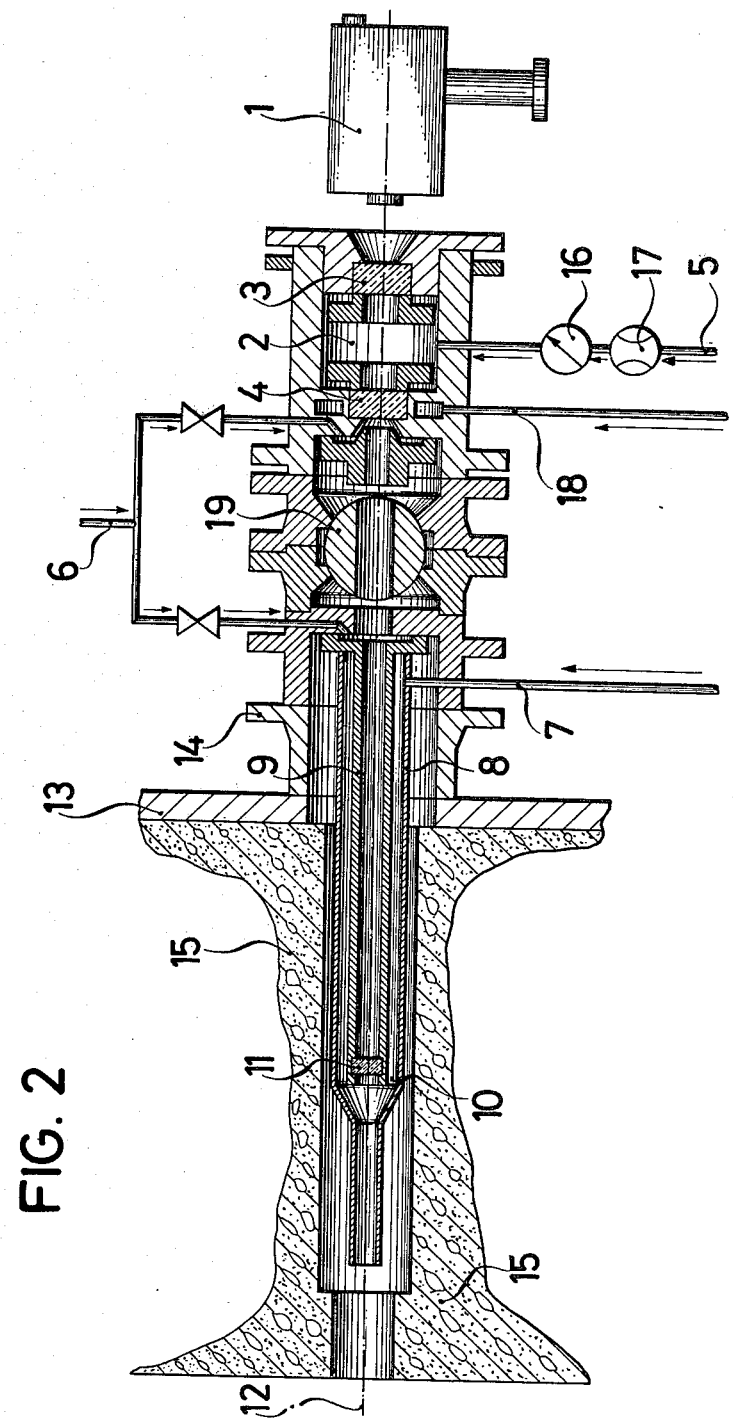
FIG. 2 is a view similar to FIG. 1 of another embodiment of the apparatus wherein between the measuring tube and the hermetic housing comprising the temperature resistant windows, there is disposed a shut-off device for use in the event of a malfunction.

Referring to the accompanying drawings, the apparatus in accordance with the invention comprises a pyrometer 1 which is aligned with an optical axis 12 and is adjusted outside the reactor. Protection against interference (outward seepage of gases) is provided by a safety chamber 2 consisting of a hermetic housing which comprises two opposed pressure-tight windows 3 and 4 made of a special glass or of quartz. The two windows 3 and 4 are disposed parallel to the optical system of the pyrometer and at right angles to the optical axis 12. The function of the safety chamber 2 is to prevent reaction gases from seeping out toward the pyrometer 1. To this end, a pressure which is higher than that prevailing in the reactor is maintained in the safety chamber through a pipe 5 which is connected to a pressure monitor 16 and a flow monitor 17. Through pipe 5 an inert gas such as nitrogen is injected. When one of the two windows 3 and 4 breaks, the pressure of the inert gas from pipe 5 necessarily drops, which will induce a flow. An alarm is then triggered by the pressure monitor 16 and the flow monitor 17 installed in pipe 5. The safety chamber is fastened as a unit to a wall 13 of the reactor through a flange 14 or is jointed to the latter through a shutoff device 19 (FIG. 2). The shutoff device (19) consists of a ball valve with a central opening. When open, the opening constitutes the exact extension of the measuring duct in the direction of the safety chamber (2). Turning the valve through 90° serves to close the measuring duct, in this way the release of hot, poisonous, explosive reaction gases from the reactor is avoided. Thus it is possible to replace the safety chamber (2) as a complete unit, without having to shut down the reactor. The measuring duct is subsequently re-opened by turning the valve once more. The entry of nitrogen through pipe (6) and steam through pipe (7) are not interrupted during the replacement of the safety chamber (2). The nitrogen pipe (6a) possesses two valves (20) and (21).

A conically constricted tube which constitutes the outer, common extension of an inner tube 9 and an outer tube 8 projects all the way to the window 4 of the safety chamber. It abuts directly on the surface of the window 4 which faces the reactor but is not fixed to it.

The inner tube 9 is surrounded by the outer tube 8, which is concentric with the inner tube 9.

Through a scavenging pipe 6a, nitrogen is introduced whose function is to keep the surface of the window 4 which faces the reactor interior free of coatings such as dust or condensed liquids that would absorb radiation. The nitrogen introduced through the scavenging pipe 6a flows through the interior of the inner tube 9 towards the reactor. To maintain the temperature necessary for trouble-free operation of the system and for the suppression of slag, the scavenging steam is introduced through a pipe 7 into the space between the outer tube 8 and the inner tube 9. Through an annular opening 10, between inner tube 9 and outer tube 8, the scavenging steam then enters the measuring duct and causes the entire measuring duct, which extends through refractory brickwork 15, to be kept free of slag that might penetrate into it from the reactor.

Built into the end of the inner tube 9 which faces the reactor interior is a heat-resistant window 11 which is mounted in such a way that nitrogen from the pipe 6 is able to flow around it. The purpose of the window 11 is to prevent scavenging steam which is conducted through the interior fo the outer tube and through the opening 10 into the reactor interior from passing through the inner tube to the window 4 of the safety chamber. The heat-resistant window 11 in the inner tube must be maintained by means of the scavenging steam or the operating temperature, at such temperature level that no condensation of water vapor can occur at the window 11. The nitrogen stream from pipe 6 is intended to prevent the condensation of water vapor on the surface of the window 4. The deposition of carbon on the window 11 is prevented in that the outer tube 8 projects beyond the inner tube 9.

Carbon particles which may form due to low measuring duct temperatures (Boudouard equilibrium) are effectively prevented from penetrating into the measuring duct since the latter is constantly being scavenged with steam from pipe 7 through the opening 10 in admixture with nitrogen from pipe 6. To prevent the temperature at window 4 from rising to unduly high levels, that window is cooled with a coolant through a cooling duct 18.

The pyrometer used may be a commercial type. It is joined to the safety chamber through a removable mount. The latter also permits the pyrometer to be aligned with the optical axis.

Figure 1:
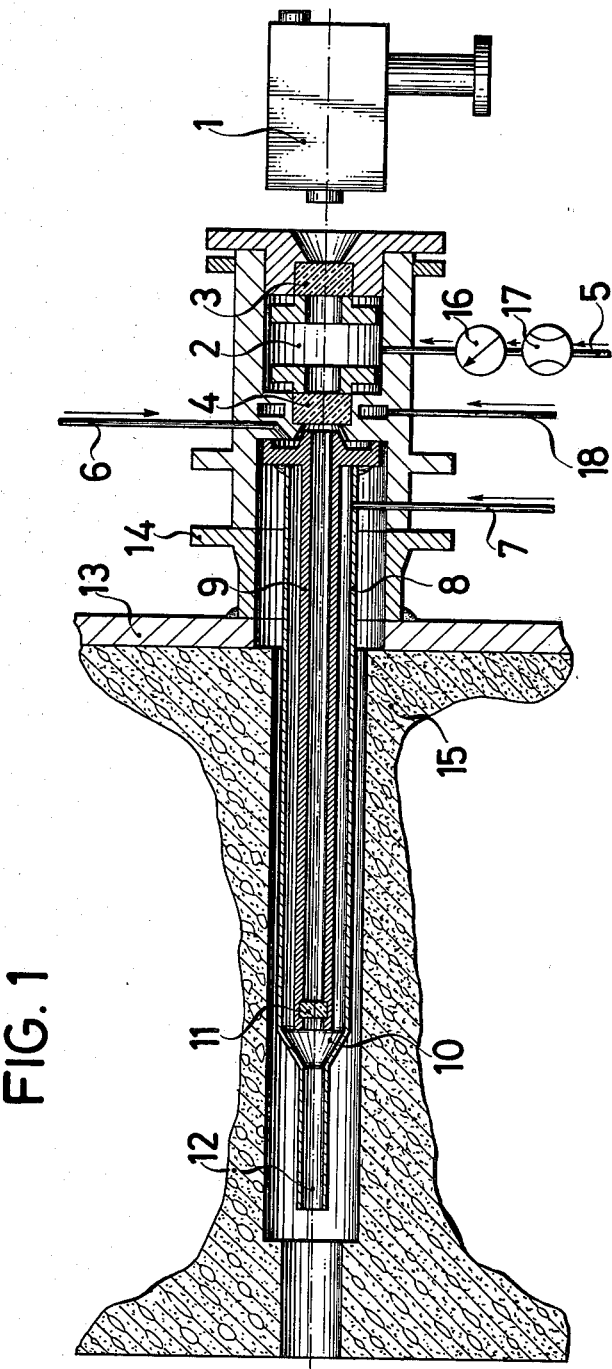
FIG. 1 is a cross-sectional elevation of an apparatus of the invention wherein the measuring tube is disposed within the exterior wall of a reactor.

Two embodiments of the system in accordance with the invention are shown in the accompanying drawings. The only difference between the embodiments shown in FIGS. 1 and 2 is that in the latter a shutoff device 19 is disposed between the safety chamber 2 and the measuring duct. In case of a malfunction, said shutoff device is closed to permit a defective safety chamber to be replaced as a unit without shutting down the reactor.

What is claimed is:

1. An apparatus for the measurement of temperatures in reactors operated at high temperatures which comprises a pyrometer in optical communication with a measuring duct disposable through a wall of a reactor and in optical communication with the reactor interior, said measuring duct comprising two concentric tubes (8,9), the outer tube (8) extending beyond the inner tube (9) in the direction of the reactor interior and having a conical construction immediately following the end of said inner tube (9), said concentric tubes being provided with a common end section in the direction of the reactor exterior, said apparatus having a housing means formed in a plurality of sections including a valved housing section, a second section having a hermetic housing defining a safety chamber (2) and interiorly joined to one of said housing sections defined between two opposed pressure-tight and heat-resistant windows (3,4), said windows in optical communication with said pyrometer, said hermetic housing joined directly to said common end section of said housing means, said common end section comprising means to join the same to a reactor wall.

2. An apparatus according to claim 1, wherein said means to join said common end section to the reactor wall comprises a flange.

3. An apparatus according to claim 2, wherein between said flange and said hermetic housing there is disposed a shutoff device in said valved section.

4. An apparatus according to claim 1, wherein said safety chamber has attached thereto a gas pipe (5) which is in fluid communication with a pressure monitor (16) and a flow meter (17), and said gas pipe is attached to a source of a gas at a pressure higher than that prevailing in a reactor to which said apparatus is attached.

5. An apparatus according to claim 1, wherein the exterior surface of one of said windows closer to the reactor interior is in fluid communication with a source of nitrogen via a pipe disposed through said apparatus, said pipe being in fluid communication with the interior of said inner tube (9) whereby when nitrogen is blown through said pipe (6) on to the surface of said window (4) which faces the reactor, the nitrogen then flows through the common conically constricted end section and through the interior of said inner tube (9) toward a reactor.

6. An apparatus according to claim 1, wherein said apparatus further comprises means to heat the zone between said outer tube and said inner tube.

7. An apparatus according to claim 6, wherein said means to heat the space between said outer tube and said inner tube comprises means for feeding a heated fluid between said outer tube (8) and said inner tube (9).

8. An apparatus according to claim 7, wherein said fluid is steam and said apparatus is provided with means to cause said steam to pass through a pipe disposed through the exterior of said apparatus, and thence into the space between the outer tube (8) and the inner tube (9), and to pass through the annular opening (10) and through the conically constricted extension of the outer tube (8), and through the opening at the end of the inner tube (9).

9. An apparatus according to claim 1, wherein said inner tube (9) has at its end towards said reactor a heat resistant window which faces the reactor, said window being mounted in such a way that there is a gap formed between said window and the tube wall of said inner tube.

10. An apparatus according to claim 1, wherein said safety chamber is provided with means to cool the same to maintain the window closer to said inner tube and said outer tube cool.

11. An apparatus according to claim 10, wherein said means to maintain said window cool comprise an inlet disposed within the body of said hermetic housing and means to circulate a coolant through said inlet.

12. An apparatus according to claim 1, wherein said common end section is conical.

* * * * *